US008892065B2

(12) United States Patent
Wohl et al.

(10) Patent No.: US 8,892,065 B2
(45) Date of Patent: Nov. 18, 2014

(54) METHOD, APPARATUS, AND COMPUTER PROGRAM PRODUCT FOR WIRELESS SIGNAL STORAGE WITH SIGNAL RECOGNITION DETECTION TRIGGERING

(75) Inventors: Michael A. Wohl, Talbott, TN (US); Thomas L. Richardson, White Pine, TN (US); Jerald W. English, Rogersville, TN (US); David S. Wisherd, Carmel, CA (US)

(73) Assignee: Zebra Enterprise Solutions Corp., Oakland, CA (US)

( * ) Notice: Subject to any disclaimer, the term of this patent is extended or adjusted under 35 U.S.C. 154(b) by 932 days.

(21) Appl. No.: 12/874,960

(22) Filed: Sep. 2, 2010

(65) Prior Publication Data

US 2011/0211453 A1    Sep. 1, 2011

Related U.S. Application Data

(63) Continuation-in-part of application No. 11/692,250, filed on Mar. 28, 2007.

(60) Provisional application No. 60/787,885, filed on Mar. 31, 2006, provisional application No. 61/239,492, filed on Sep. 3, 2009.

(51) Int. Cl.
*H04B 1/26* (2006.01)
*G01S 5/02* (2010.01)
*G01S 5/00* (2006.01)

(52) U.S. Cl.
CPC *G01S 5/02* (2013.01); *G01S 5/0009* (2013.01)
USPC .................. 455/316; 455/41.1; 455/456.1

(58) Field of Classification Search
USPC ........................................ 455/316
See application file for complete search history.

(56) References Cited

U.S. PATENT DOCUMENTS 5,600,673 A    2/1997    Kimura et al.
5,621,412 A    4/1997    Sharpe et al.
(Continued)

FOREIGN PATENT DOCUMENTS

CN        1537395 A      10/2004
WO    WO-92/20173 A1    11/1992
(Continued)

OTHER PUBLICATIONS

Search Report for European Application No. 10010815.8, dated Nov. 10, 2010; 5 pages.
(Continued)

*Primary Examiner* — Ajibola Akinyemi
(74) *Attorney, Agent, or Firm* — Alston & Bird LLP (57) ABSTRACT

Various methods for wireless signal storage with signal recognition detection triggering are provided. One method may include receiving a plurality of wireless signals via a plurality of frequency channels, storing representations of the plurality of wireless signals in a signal buffer, and receiving a trigger request for a signal of interest. In this regard, the trigger request may have been generated based on an analysis of at least one wireless signal within the plurality of wireless signals to thereby identify the signal of interest. The method may also include retrieving a representation of the signal of interest from the signal buffer based on the trigger request, and analyzing the retrieved representation of the signal of interest with associated signal characteristics to determine a location of a source of the signal of interest. Similar apparatuses and computer program products are also provided.

28 Claims, 5 Drawing Sheets

(56) References Cited

U.S. PATENT DOCUMENTS

| | | |
|---|---|---|
| 5,651,030 A | 7/1997 | Wong et al. |
| 5,764,686 A | 6/1998 | Sanderford et al. |
| 5,920,287 A | 7/1999 | Belcher et al. |
| 5,995,046 A | 11/1999 | Belcher et al. |
| 6,121,926 A | 9/2000 | Belcher et al. |
| 6,127,976 A | 10/2000 | Boyd et al. |
| 6,154,657 A | 11/2000 | Grubeck et al. |
| 6,240,282 B1 | 5/2001 | Kleider et al. |
| 6,380,894 B1 | 4/2002 | Boyd et al. |
| 6,463,107 B1 | 10/2002 | Lindoff et al. |
| 6,593,885 B2 | 7/2003 | Wisherd et al. |
| 6,657,586 B2 | 12/2003 | Turner |
| 6,717,934 B1 | 4/2004 | Kaasila et al. |
| 6,853,687 B2 | 2/2005 | Harrington et al. |
| 6,892,054 B2 | 5/2005 | Belcher et al. |
| 6,987,744 B2 | 1/2006 | Harrington et al. |
| 7,046,657 B2 | 5/2006 | Harrington et al. |
| 7,139,583 B2 | 11/2006 | Yamasaki et al. |
| 7,190,271 B2 | 3/2007 | Boyd |
| 7,218,274 B2 | 5/2007 | Arikan et al. |
| 7,386,063 B1 | 6/2008 | Husted |
| 2002/0015423 A1 | 2/2002 | Rakib et al. |
| 2002/0080759 A1 | 6/2002 | Harrington et al. |
| 2002/0181565 A1 | 12/2002 | Boyd et al. |
| 2002/0183020 A1 | 12/2002 | Zhu et al. |
| 2003/0017832 A1 | 1/2003 | Anderson et al. |
| 2003/0185216 A1* | 10/2003 | Wende et al. ............ 370/395.5 |
| 2004/0078151 A1 | 4/2004 | Aljadeff et al. |
| 2004/0137915 A1 | 7/2004 | Diener et al. |
| 2004/0157621 A1 | 8/2004 | Yamasaki et al. |
| 2005/0227661 A1 | 10/2005 | Ginzburg |
| 2006/0095199 A1 | 5/2006 | Lagassey |
| 2006/0142041 A1 | 6/2006 | Tomasin et al. |
| 2006/0258371 A1 | 11/2006 | Krishnamurthi et al. |
| 2007/0103140 A1* | 5/2007 | Bernard ................ 324/76.21 |
| 2007/0155306 A1* | 7/2007 | Koli et al. ................. 455/3.01 |
| 2007/0184851 A1* | 8/2007 | Barnwell et al. .......... 455/456.1 |
| 2007/0230424 A1 | 10/2007 | Wisherd |
| 2007/0280182 A1 | 12/2007 | Wisherd et al. |
| 2008/0045236 A1 | 2/2008 | Nahon et al. |
| 2008/0130604 A1 | 6/2008 | Boyd |
| 2008/0253314 A1 | 10/2008 | Stephenson et al. |
| 2012/0214414 A1* | 8/2012 | Abel et al. ................ 455/41.1 |

FOREIGN PATENT DOCUMENTS

| | | |
|---|---|---|
| WO | WO-03/009613 A1 | 1/2003 |
| WO | WO-2004/019559 A2 | 3/2004 |
| WO | WO-2007/126819 A1 | 11/2007 |

OTHER PUBLICATIONS

International Search Report and Written Opinion for International Appl. No. PCT/US2010/047792, mailed Feb. 23, 2011.
Non-Final Office Action from U.S. Appl. No. 11/692,250, mailed Mar. 1, 2011.
Office Action from U.S. Appl. No. 11/692,250, dated May 29, 2012.
Office Action for Chinese Application No. 201080049740.4; dated Nov. 4, 2013.
Office Action for U.S. Appl. No. 11/692,250; dated Nov. 13, 2009.
Office Action for U.S. Appl. No. 11/692,250; dated May 24, 2010.
Office Action for U.S. Appl. No. 11/692,250; dated Sep. 16, 2010.
Office Action for U.S. Appl. No. 11/692,250; dated Aug. 29, 2011.
International Preliminary Report on Patentability for Application No. PCT/US2007/007573; dated Jun. 10, 2008.
International Preliminary Report on Patentability for Application No. PCT/US2010/047792; dated Mar. 6, 2012.
International Search Report and Written Opinion for Application No. PCT/US2007/007573; dated Oct. 4, 2007.

* cited by examiner

METHOD, APPARATUS, AND COMPUTER PROGRAM PRODUCT FOR WIRELESS SIGNAL STORAGE WITH SIGNAL RECOGNITION DETECTION TRIGGERING

CROSS-REFERENCE TO RELATED APPLICATION

This application is a continuation-in-part of, and claims the benefit of the earlier filing date under 35 U.S.C. 120 of, application Ser. No. 11/692,250 filed Mar. 28, 2007, which claims priority to provisional Application Ser. No. 60/787,885 filed Mar. 31, 2006. This application also claims the benefit of the earlier filing date of provisional Application Ser. No. 61/239,492 filed Sep. 3, 2009. The content of application Ser. Nos. 11/692,250, 60/787,885, and 61/239,492 are hereby incorporated by reference in their entirety herein.

TECHNICAL FIELD

Embodiments of the present invention relate generally to the field of wireless local area networks (WLANs), and more particularly, embodiments of this invention relate to real-time location systems and WLANs.

BACKGROUND

Wireless local area networks (WLANs) and real time location systems (RTLS's) are becoming more commonplace as the use of portable computers, such as "laptop," "notebook," and "pen" computers become increasingly common in office environments, industrial environments, homes, retail stores, and other locations. With the increasing availability and decreasing cost of wireless networking technology, WLAN receivers have been developed that can implement real-time locating. However, many receivers often suffer from a lack of processing power and are therefore incapable of analyzing all of the signals being communicated within a system. Since signal processing activities can often be computationally intensive, the limited computing power of the receivers can lead to the missed communications due to the receiver being unable to analyze incoming signals at the rate that the communications are received. Dropped or missed communications can result in system lag times and failed locating operations for RTLS solutions. As such, an inability to process network traffic in real-time or near-real-time may have undesirable impacts on the RTLS aspects of the network, which are expected to provide real-time or near-real-time indication of asset locations.

BRIEF SUMMARY

Methods, apparatuses, and computer program products are described that buffer wireless communications signals on a plurality of frequency channels within a wireless communications network to support rapid post-processing of the buffered signals. In this regard, one or more signal buffers may be implemented to store wireless communications signals received on a plurality of frequency channels in association with time-of-arrival information. One or more receivers, and/or a central processing agent, may be configured to analyze frequency channels to identify a signal of interest and send trigger requests to the signal buffers for retrieval one or more data representations of the signal of interest, possibly for a source location determination. In some example embodiments, the representations of the signal of interest may be captured from spatially separated apertures and retrieved in response to at least a common trigger. Signals of interest stored in the signal buffers may be retrieved and subsequently analyzed for the purpose of real-time locating or other network applications.

In this regard, receivers within a communications system or network may be configured to receive and store signals received on a broad portion of the radio frequency spectrum. The receivers, however, may be tuned to one or more frequency channels within the broad portion of the RF spectrum for triggering. In accordance with some example embodiments, a receiver may be configured to trigger on a few frequency channels, while the same receiver may be configured to receive and store data representations of signals received on a larger number of frequency channels. Upon detection of a signal of interest by a receiver, a trigger event may occur. In response, a trigger request may be generated, and the trigger request may be transmitted by the triggering receiver (the receiver that generates the triggering request) to other receivers. For example, the trigger request may be transmitted to receivers in the area that are likely to have also received the signal of interest. The other receivers may be configured to retrieve a data representation of the signal of interest from a respective signal buffer and provide the data representation for analysis.

Various methods, apparatuses, and computer program products according to example embodiments of the present invention are provided herein. One example method for wireless signal storage with signal recognition detection triggering includes receiving a plurality of wireless signals via a plurality of frequency channels, storing representations of the plurality of wireless signals in a signal buffer, and receiving a trigger request for a signal of interest. In this regard, the trigger request may have been generated based on an analysis of at least one wireless signal within the plurality of wireless signals to thereby identify the signal of interest. The example method also includes retrieving a representation of the signal of interest from the signal buffer based on the trigger request and analyzing the retrieved representation of the signal of interest with associated signal characteristics to determine a location of a source of the signal of interest.

In another example embodiment, an apparatus for wireless signal storage with signal recognition detection triggering is provided. The example apparatus comprises a radio frequency front end configured to receive a plurality of wireless signals via a plurality of frequency channels, and a signal buffer configured to store representations of the plurality of wireless signals. The example apparatus also comprises a processor configured to receive a trigger request for a signal of interest. In this regard, the trigger request may have been generated based on an analysis of at least one wireless signal within the plurality of wireless signals to thereby identify the signal of interest. The processor of the example apparatus is also configured to retrieve a representation of the signal of interest from the signal buffer based on the trigger request, and analyze the retrieved representation of the signal of interest with associated signal characteristics to determine a location of a source of the signal of interest.

In yet another embodiment, an example computer program product for wireless signal storage with signal recognition detection triggering is provided. The example computer program product comprises at least one computer-readable storage medium having executable computer-readable program code instructions stored therein. The computer-readable program code instructions of the example computer program product are configured to store representations of a plurality of wireless signals in a signal buffer. In this regard, the plurality of wireless signals may have been received via a plurality of frequency channels. The computer-readable program code instructions of the example computer program product are also configured to retrieve a representation of a signal of interest from the signal buffer based on the trigger request, and analyze the retrieved representation of the signal of interest with associated signal characteristics to determine a location of a source of the signal of interest. In this regard, the trigger request may have been generated based on an analysis of at least one wireless signal within the plurality of wireless signals to thereby identify the signal of interest.

Another example apparatus for wireless signal storage with signal recognition detection triggering includes means for receiving (e.g., a radio frequency front end or a processor) a plurality of wireless signals via a plurality of frequency channels, storing representations of the plurality of wireless signals in a signal buffer, and means for receiving (e.g., a processor) a trigger request for a signal of interest. In this regard, the trigger request may have been generated based on an analysis of at least one wireless signal within the plurality of wireless signals to thereby identify the signal of interest. The example apparatus also includes means for retrieving (e.g., a processor) a representation of the signal of interest from the signal buffer based on the trigger request, and means for analyzing (e.g., a processor) the retrieved representation of the signal of interest with associated signal characteristics to determine a location of a source of the signal of interest.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Figure 1:
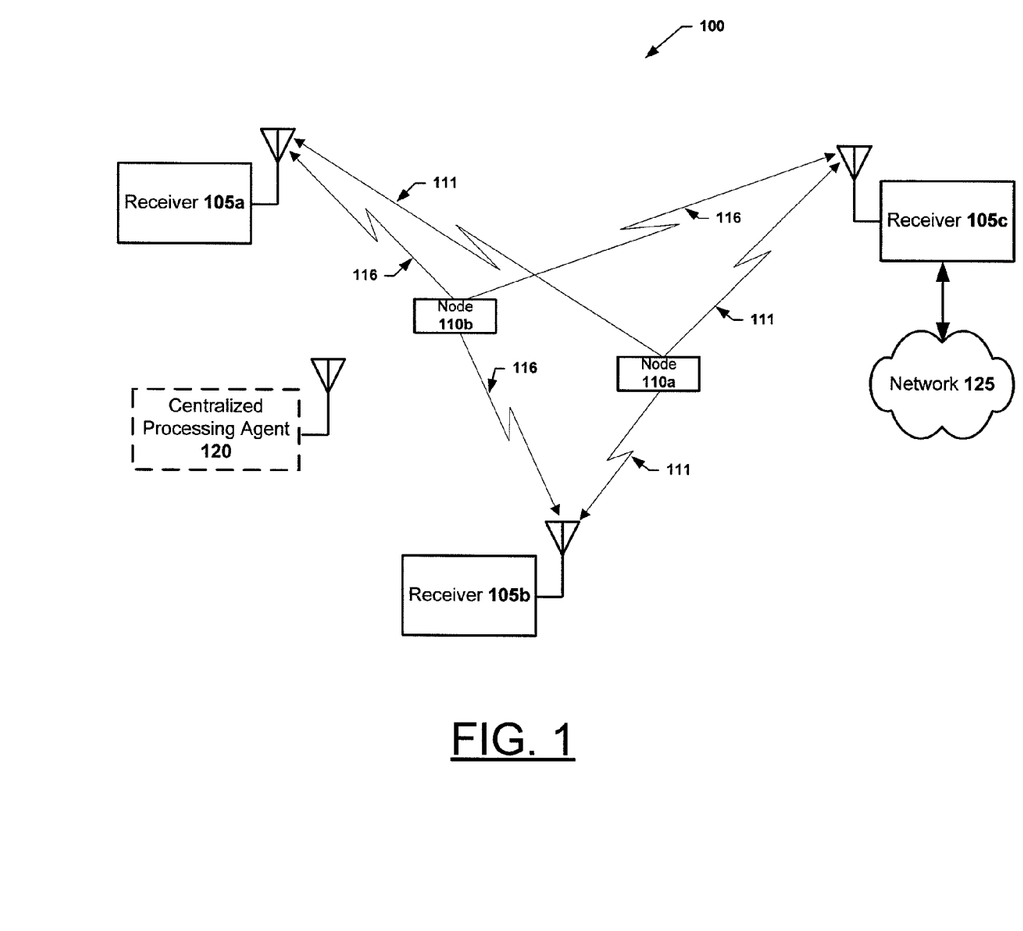
FIG. 1 illustrates an example wireless communications system according to various example embodiments of the present invention.

In accordance with an example embodiment of the present invention, FIG. 1 depicts communications system 100. The system 100 may include one or more receivers 105 (e.g., receivers 105a, 105b, and 105c) and one or more nodes 110 (e.g., nodes 110a and 110b). The system 100 may also include a network 125 in communication with one or more receivers 105, and, in some example embodiments, the system 100 may include a centralized processing agent 120.

According to various example embodiments, the system 100 may be a wireless local area network (WLAN), or any other type of wireless network, and may support communications via any type of communications standard. Wireless communications within the system 100 (e.g., communications between the nodes 110 and the receivers 105) may be conducted on one or more frequency or communication channels. The system 100 may be configured to support passive applications such as differential time-of-arrival (DTOA) location applications where, for example, a node 110 transmits a signal to receivers 105 that may be detected and analyzed to identify the location of the node 110. As a more specific example, the system 100 may be configured to support communications in accordance with ISO24730 standards. The system 100 may additionally or alternatively be operative as a system for locating WLAN terminals and tag transmitters, or nodes, such as nodes 110.

Nodes 110 may be devices or mobile terminals configured for use in a communications system, such as a WLAN communications system. In some example embodiments, the nodes 110 may be configured to implement aspects of an RTLS. Nodes 110 may be tags with wireless communications capabilities. In some example applications, the nodes 110 may be affixed to mobile physical assets to facilitate determining the location of the associated asset. In some example embodiments, the nodes 110 may be operative as ISO24730 devices. In some example embodiments, a receiver device (e.g., prior to configuration within the system as a receiver 105) may be treated as a node and signals originating from the receiver device may be analyzed using locating techniques, such as for example those described herein, to identify the location of the receiver device. In this regard, using these locating techniques to locate a receiver device, that is being treated as a node, may be part of a configuration procedure for configuring, for example, general purpose receiver device as a receiver 105.

According to various example embodiments, a node 110 may be configured to transmit a wireless signal for the purpose of locating the node 110. In this regard, a node 110 may be configured to transmit a wireless signal to the receivers 105 to facilitate locating the node 110 using, for example, triangulation or other RTLS solutions. Referring to FIG. 1, node 110a may transmit wireless signal 111 and node 110b may transmit wireless signal 116 to facilitate determining the geographic location of node 110a and node 110b, respectively.

In some example embodiments, nodes 110 may be, additionally or alternatively, configured to communicate as WLAN devices. In this regard, the nodes 110 may be stationary or mobile communications terminals such as, a computer, a server, a printer, an RFID reader, a barcode scanner, a kiosk, a multiband telephone, a network storage device, or a mobile terminal (e.g., a mobile telephone, a mobile multiband telephone, a portable digital assistant (PDA), a pager, a mobile television, a gaming device, a mobile or laptop computer, a camera, a video recorder, an audio/video player, a radio, a global positioning system (GPS) device, any combination of the aforementioned, or the like).

The centralized processing agent 120 may be a computer, server, or other network device in communication with the system 100, via a wired or wireless connection. As depicted in FIG. 1, for example, the centralized processing agent 120 includes an antenna for network communications. The central processing agent 120 may be configured to perform any type of central processing for the system 100. For example, the central processing agent 120 may be configured to perform computations with respect to signals of interest as further described below. Additionally, or alternatively, the central processing agent 120 may be configured to perform triggering with respect to predefined waveforms (e.g., a preamble of a WiFi transmission) as further described below.

While in some example embodiments the central processing agent 120 may be a single network entity, according to various other alternative embodiments, the functionality of the central processing agent as described herein may be separated and/or distributed within the system 100, for example, to the receivers 105.

The network 125 may be any type of wired or wireless network included as part of the broader architecture of the system 100. Network 125 may incorporate connections to other local area networks (LANs) or WLANs, and network 125 may, in some example embodiments, provide a connection between the system 100 and the Internet. While network 125 is depicted in FIG. 1 as being connected or in communication with receiver 105c, according to various exemplary embodiments, some or all of the receivers 105 of system 100 may be connected or in communication with network 125, and some or all of the nodes 110 of system 100 may also be connected or in communication with the network 125. In some example embodiments, the receivers 105 may be connected as clients to the network 125.

Within the system 100, the receivers 105 may be configured to facilitate some or all wireless communications. The receivers 105 may be configured to receive communications from any entity with the system 100, and transmit communications to any entity within system 100. In addition to being communication points within the system 100, the receivers 105 may be configured to support various aspects of an RTLS, such as receiving signals from the nodes 110 for locating purposes.

Figure 2:
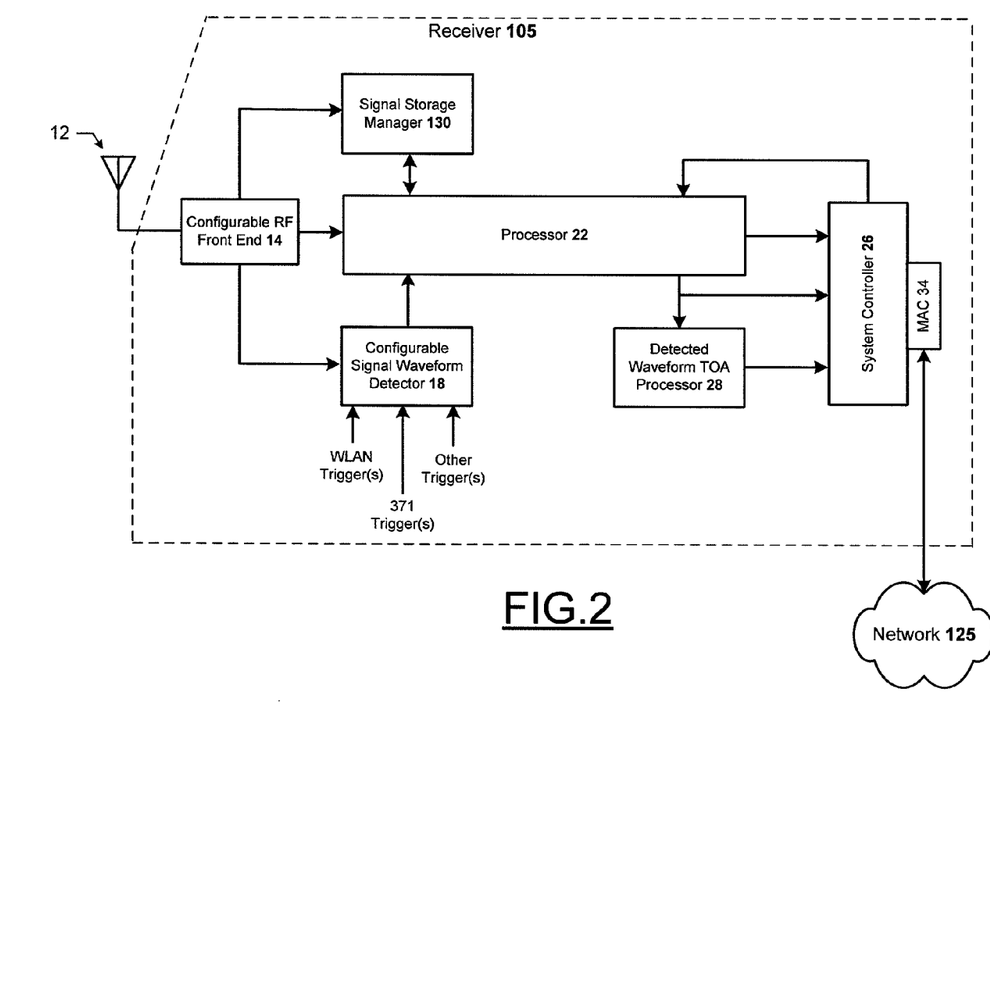
FIG. 2 is a block diagram of an example receiver according to various example embodiments of the present invention.

FIG. 2 provides a detailed block diagram of a receiver 105. A receiver 105 may be configured to facilitate communications within the system 100. The capacity to handle communications within the system 100 may be optimized via frequency re-use by configuring each of the receivers 105 to analyze particular channels as further described below, and generally herein. The system 100, via the configuration of the receivers, may be usable as a "soft" (modular and software upgradable) location processor system for different types of wireless signal formats, frequencies, or combinations.

Example embodiments of the system 100, via the configuration of the receivers 105, provide for low complexity and simplicity of operation with existing information technology communications networks. The receivers 105 may be configured to operate as active antennas and may isolate an RTLS layer from the network 125 and allow upgrades for more flexibility. In some example embodiments, the system 100 may comply with existing and evolving network security processes by having the receivers 105 operate as clients in addition to or in lieu of access points (APs). As a result, receivers 105, according to various example embodiments, may lower the cost of an RTLS detection at the physical layer. The receivers 105 can be remotely set to modulation formats and frequencies that are completely independent of a host access point that may be associated with network 125.

Referring to FIG. 2, the receiver 105 may include an antenna 12, and a configurable radio frequency (RF) front-end circuitry 14. The antenna 12 may be a single frequency or multi-band antenna. The antenna 12 may be representative of diversity antennas, and the antenna 12 may be configured to support post-processing of signal buffer data based on the type of antenna used by the RF front-end.

The configurable RF front-end circuitry 14 may also be single frequency or multi-band for receiving signals at various frequencies. According to some example embodiments, a receiver 105 may include one or more RF front-ends that may be configured for one or more particular frequency bands and/or modulation types. According to some example embodiments, the RF front-end circuitry 14, as well as other portions of the receiver 10, may include or be implemented by a frequency synthesizer (e.g., Analog Devices F4360-0) and a frequency down converter (e.g., Analog Devices 8347). The RF front-end circuitry 14 may be configured to perform signal detection on a broad portion of the RF spectrum or wide portions of the industrial, scientific, and medical (ISM) RF band, which may be either full or partial bandwidth to constrain the number of detected signals. In this regard, the RF front-end circuitry 14 may be configured to detect signals on a plurality of frequency channels. In some example embodiments, the RF front-end circuitry 14 may be configured for baseband signal detection and processing of incoming signals. In this regard, according to some example embodiments, the RF front-end circuitry 14 may be configured to down covert received signal into a baseband, and may be configured to down convert signals received on multiple bands into a segmented or overlapped baseband. Upon the detection of a signal, the RF front-end circuitry 14 may be configured to provide the detected signal or signals to the signal storage manager 130, the processor 22, and/or a configurable signal waveform detector 18. Frequency channel information (e.g., an indication of a channel on which a signal was received/detected) may also be provided by the RF front-end circuitry 14. According to various example embodiments, the timing information and the frequency channel information may be provided to the signal storage manager 130 for storage in association with data representations of received signals.

The configurable signal waveform detector 18 may be a triggering mechanism for the receiver 105 used to identify a signal of interest for further processing. In this regard, the waveform detector 18 may be configured to compare a representation of a signal provided by RF front-end circuitry 14 to a predefined waveform (also referred to as a trigger). A predefined waveform may be defined with respect to pattern of data, the type of modulation, the bit spacing, and/or the like. According to some example embodiments, the waveform detector 18 may additionally, or alternatively, be configured to trigger on received content within a communication, such as content of a data packet. For example, the content that causes a triggering may be a source or destination MAC address, or other protocol parameters and specifics in, for example, a WLAN architecture. The content that causes triggering may further specify a particular asset of interest among many assets with a similar modulation and/or channel characteristics. If a match is identified between the predefined waveform and the received signal, a signal of interest has been identified and a trigger event may occur. In response to the trigger event, a trigger signal may be provided to the processor 22 indicating that further action should be taken with respect to the signal. According to various embodiments, the waveform detector 18 may be configured to perform triggering on representations of baseband signals provided by the RF front-end circuitry 14.

An example predefined waveform for triggering may be a leading edge of a signal on a particular frequency channel. When the signal is received and the leading edge is identified by the waveform detector 18, a triggering event may occur. In response, a trigger signal may be generated and provided to the processor 22 indicating that a signal of interest has been identified. Further examples of predefined waveform may include the preamble of a transmission such as a WiFi transmission, a data pattern including a particular address, a data pattern of particular ID frame of a device (e.g., an ID frame that includes a MAC address), a handshake pulse, a data pattern for a unique identifier matched with a particular channel, a transmitter signature or fingerprint (e.g., a unique modulation and frequency movement and distortion possibly due to heating at power up of the transmitter), or the like.

The waveform detector 18 may be configured to trigger in accordance with various predefined signal waveforms on various target frequency channels. For example, predefined waveforms may be defined for WLAN signals (e.g., IEEE 802.11 signals including 802.11b, 802.11g, and 802.11n), ANSI 371 signals (e.g., ANSI 371 signals formatted in accordance with ISO24730), ISO2730-5 signals, Ultra-wide Band (UWB) signals (including UWB 500 and UWB 1000), IEEE 802.15.4 and 4a, Zigbee, ISO 18000-7, Bluetooth signals, OFDM (orthogonal frequency division multiplexed) signals, and the like. The predefined waveforms may be defined with respect to various waveform attributes, such as the shape of the waveform, the modulation type, data format, and/or time-of-arrival (TOA) information. Further, the waveform detector 18 may be configured to trigger based on any number of predefined waveforms targeting various frequency channels. In some example embodiments, the waveform detector 18 may be configured to trigger on signals received on select frequency channels. In this regard, while the RF front-end circuitry 14 may be receiving/detecting signals on a larger number of frequency channels, the waveform detector 18 may be triggering on only a subset of those frequency channels.

The receiver 105 may also include a signal storage manager 130. The signal storage manager 130 may be configured to receive representations of signals received/detected by the configurable RF front-end circuitry 14 and store the representations. The signal storage manager 130 may also be configured to receive requests for stored representations of signals (trigger requests), and retrieve the data associated with the signals for transmission and/or analysis of the representations of signals.

Figure 3:
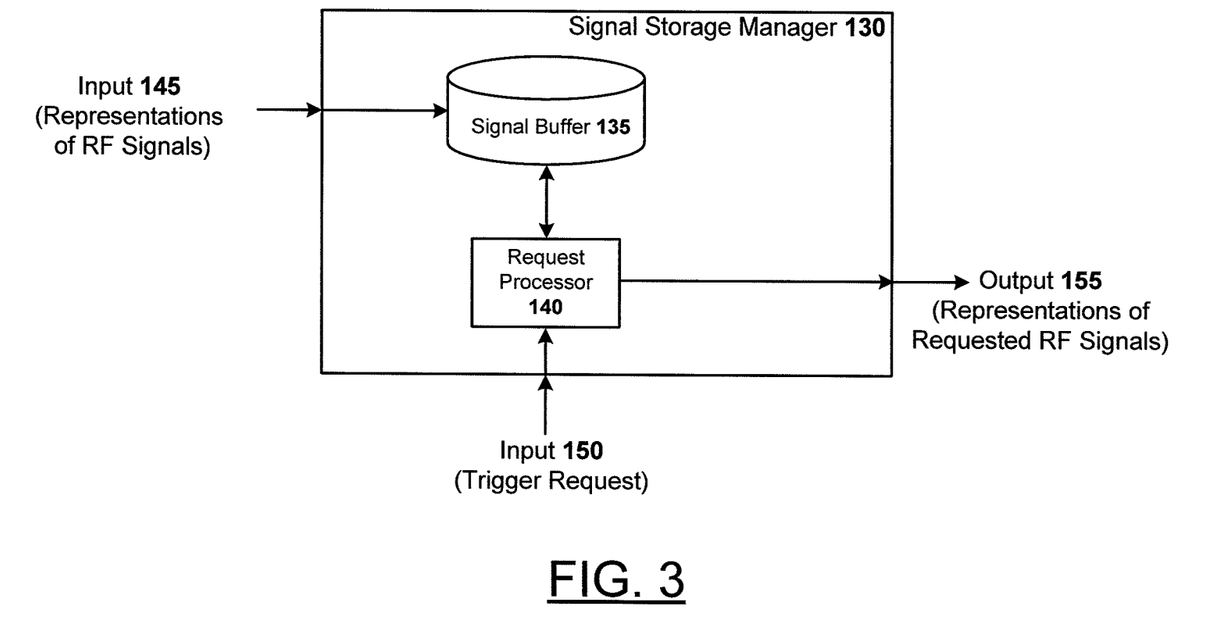
FIG. 3 illustrates an example signal storage manager according to various example embodiments of the present invention.

FIG. 3 depicts a detailed block diagram of the signal storage manager 130, which may include a signal buffer 135 and a request processor 140. The signal storage manager 130 may be incorporated as a separate hardware device into a receiver 105, or the signal storage manager 130, or some aspects of the signal storage manager 130, may be incorporated into other sub-components of a receiver 105, such as the processor 22 described below. In some example embodiments, the signal storage manager 130 may be embodied as a computer program product that resides within the memory and circuitry of the receiver 105.

The signal buffer 135 may be any type of computer-readable memory storage device configured to store a plurality of representations (e.g., data representations) of received signals. According to various example embodiments, the signal buffer 135 may include volatile and/or non-volatile memory. For example, signal buffer 135 may include Random Access Memory (RAM) including dynamic and/or static RAM, on-chip or off-chip cache memory, and/or the like. In some example embodiments, the signal buffer 135 and the request processor 140 may be included on a common chip. In some example embodiments, the signal buffer 135 may be hard drive, a flash memory card, or the like.

The signal buffer 135 may be configured to receive a plurality of representations of wireless signals via the input 145. According to some embodiments, input 145 may be connected or otherwise in communication with the RF front-end circuitry 14, such that representations of signals may be received by the signal buffer 135 from the RF front-end circuitry 14 for storage within the signal buffer 135. In some example embodiments, the representations of signals may be received as representations of baseband signals.

The signal buffer 135 may be configured to store the representations of signals in a circular manner. In this regard, representations of signals may be stored until the memory capacity of the signal buffer 135 is exhausted or full. Once the signal buffer 135 is full, the signal buffer 135 may overwrite the oldest representations of signals with a newly received representation. According to various example embodiments, the memory capacity of the signal buffer 135 may be selected based on the latency in, for example, communications of the system 100 and the latency associated with the analysis of signals, so as to avoid situations where the signal buffer 135 is overwriting representations of signals that may still be needed for analysis. According to some example embodiments, the signal buffer may be sized to allow for storage of signals received within a quarter-second (¼ s).

According to various example embodiments, the representations of signals may be stored in association with timing information describing when the associated signal was received (e.g., time-of-arrival and duration) and frequency channel information describing the channel upon which the associated signal was received. According to various example embodiments, the timing information and the frequency channel information may be used as query criteria in a trigger request to retrieve data representative of a signal of interest.

The request processor 140 may be a microprocessor, digital signal processor, an application specific integrated circuit (ASIC), field programmable gate array (FPGA), or the like. The request processor 140 may be a separate, individual processing device, or the request processor 140 may be incorporated in to another processing device, such as the processor 22 described below. The request processor 140 may be configured to receive a trigger request. A trigger request may be a message or command to retrieve a particular representation of a signal from the signal buffer 135. The trigger request may include signal criteria, which may be used to locate the data associated with the signal of interest in the signal buffer 135. The trigger request may also include destination information indicating where retrieved signal data should be sent for analysis. The trigger request may be received by the request processor 140 via the input 150. As further described below, a trigger request may originate from a number of entities within the system 100. Nonetheless, the request processor 140 may receive the trigger request, retrieve the data representation of the signal of interest identified by the trigger request, and send the retrieved data to a destination via the output 155.

According to some example embodiments, predefined waveforms used for comparisons by the waveform detector 18 may stored in association with other information for use in generating trigger requests. Destination information for inclusion in a trigger request may be stored in association with a predefined waveform. For example, when a trigger event occurs with respect to a particular predefined waveform, destination information for routing a trigger request may be retrieved for inclusion in the trigger request.

Referring again to FIG. 2, the processor 22, which in some example embodiments may be a baseband processor, may be configured to analyze or otherwise take action with respect to a signal of interest. For example, the processor 22 may be configured to perform locating of a node (e.g., the nodes 115)

by analyzing data representations of signals of interest received at various receivers 105.

According to some example embodiments, the processor 22 may be configured to receive a trigger signal from the waveform detector 18, and analyze a corresponding signal received from the RF front-end circuitry 14. In this regard, the processor 22 can support multiple waveform types and may perform signal capture based on a priori for trigger generation. Further, the processor 22 may be configured to receive a trigger signal from the waveform detector 18, and generate a trigger request to be transmitted to other receivers 105 via the system controller 26, the media access controller (MAC) 34 and the network 125. In this regard, each receiver 105 may be provided a unique MAC address. The receivers 105 that are in receipt of the trigger request may retrieve a data representation of a signal of interest, possibly from a respective signal storage manager 130, and transmit the retrieved data to the requesting receiver 105 or another network entity for analysis of the signal of interest.

Accordingly, the processor 22 may be configured to act in a number of ways in response to a trigger event that occurs in a receiver 105 somewhere in the system 100. For example, the receiver 105 may respond to a local trigger event (a trigger event that is identified by the waveform detector 18 within the receiver 105). In this regard, a local trigger event may occur due to a match being identified between a predefined waveform and a received signal by the waveform detector 18. The processor 22 may receive a trigger signal from the waveform detector 18. In response to the trigger signal, the processor 22 may analyze a representation of a signal of interest received from the RF front-end circuitry 14.

A local trigger event may additionally or alternatively cause the processor 22 to send a trigger request to the signal storage manager 130 for retrieval of a data representation of the signal of interest for analysis. The processor 22 may alternatively, or additionally, send a trigger request to remote receivers 105 to retrieve data representations of signals of interest from the other receivers for a combinational analysis of the data representation. According to some example embodiments, analysis of signals may occur at a central location, rather than within a receiver, such as at the central processing agent 120, and the trigger request may be defined such that data associated with signals of interest are sent to a destination being the central location for analysis.

Further, the processor 22 may receive a trigger request from a remote receiver 105 as a result of a remote trigger event (a trigger event that is identified by a waveform detector of another network entity, such as another receiver 105). Due to a remote trigger event, the processor 22 may receive a trigger request from the other receiver, or other network entity. The processor 22 may, in turn, retrieve the data associated with the signal of interest and transmit the data to a destination location in accordance with the trigger request.

According to various applications that may be implemented by the receivers 105 (e.g., RTLS applications), the receivers 105 may require access to information regarding the location of various receivers 105 within the system 100 to determine which receiver may have received a signal of interest. In this regard, trigger requests may be sent to only those receivers 105 that may have received a signal.

To identify nearby receivers for transmission of trigger requests, a data structure, such as a list, table, database or the like, of receiver information including, for example, an address, a geographic location, and the like, may be maintained. The data structure may be programmable into a receiver 105's firmware. In some example embodiments, a triggering receiver may transmit the trigger request to a central network entity (e.g., the centralized processing agent 120) where receiver information is maintained, and the central network entity may forward the trigger request to the appropriate receivers for retrieval of a signal of interest.

The receiver 105 may also include a TOA (time-of-arrival) processor 28, a system controller 26, and a media access controller (MAC). According to various example embodiments that implement aspects of an RTLS, a data representation of a signal of interest may be sent to a TOA processor 28 to produce and/or evaluate a timing information (e.g., a time stamp) to facilitate location determinations. Additionally, information associated with a signal of interest may be sent to the system controller 26, which may manage both the real-time configuration of the receiver 105 and the data to be communicated outbound through the MAC 34. The system controller 26 may include signal timing circuitry for generating and providing timing information (e.g., in the form of a time stamp) associated with received/detected signals to be provided for analysis to the processor 22 and other components of the receiver 105. In this regard, the system controller 26 may also preconfigure the RF front-end circuitry 14, the waveform detector 18, and the processor 22 based on locally generated and remote system requirement-based instructions. The MAC device 34 may direct data, as a client, through either a wired or wireless connection, to the network 125. The system controller 26 may also feedback specific signal mode and location asset identifier (ID) commands to the processor 22 that work in conjunction with the TOA processor 28 for determining asset locations such as the locations of nodes 110 or 115 of FIG. 1.

According to various example embodiments, the retrieved representations of a signals of interest may be analyzed by the processor 22 and/or the TOA processor 28 for asset location based on time-of-arrival or timing information associated with the signal. As such, a receiver 105 may be configured as a location processor such as described in commonly assigned U.S. Pat. Nos. 5,920,287; 5,995,046; 6,121,926, 6,127,976, and International Application No. PCT/US2007/007573, the disclosures of which are hereby incorporated by reference in their entirety. Further, the processor 22, the TOA processor 28, and/or an external processor (e.g., a processor of the centralized processing agent 120) may be configured to perform signal origination locating based on various techniques including angle of arrival (AoA), line-of-sight (LoS), time of arrival (ToA), time difference of arrival (TDoA), received channel power indication (RCPI), received signal strength indication (RSSI), time of flight (ToF), two way ranging (TWR), symmetrical double sided—two way ranging (SDS-TWR), near field electromagnetic ranging (NFER), or the like.

Based on the foregoing, the implementation of signal buffering within the receiver 105 in accordance with some embodiments allows for post-processing of the respective signals. In this manner, increasingly intense and complex computation (e.g., RTLS computation) with respect to the signals of interest may be undertaken without the drawback of potentially missing other signals while computation is ongoing. As such, various example embodiments of the present invention allow for the performance of computationally intensive location algorithms, such as those with higher quality factors (i.e., more reliable results), while also avoiding the loss of received signals. Further, according to various example embodiments, post-processing of buffered data yields improvements in DTOA determination beyond real-time waveform detection.

According to various example embodiments of the present invention, triggering to generate a trigger signal and/or a trigger request may be performed in a variety of ways. Triggering may be performed in a distributed manner, where each receiver 105 performs triggering with respect to a sub-portion of the spectrum, while also buffering signals received in a larger portion of the spectrum. As such, a plurality of receivers may collectively operate to perform triggering with respect to any signal within the larger portion of the spectrum when the system 100 is configured in such as way. As such, the system 100 may employ a distributed triggering solution, and therefore the system 100 may be scalable with respect to triggering.

An example embodiment that involved a local triggering solution was provided above. However, other triggering solutions may be employed separately or in combination. In one triggering solution, a centralized processor (e.g., a centralized processor of the centralized processing agent 120), possibly in the form of a security processor, may be implemented for triggering purposes within the system 100.

According to various example embodiments, the centralized processor may be implemented by and/or included within the centralized processing agent 120. In this regard, the centralized processing agent 120 may be a WLAN AP configured to move received signals and the data packets within the received signals through a processor (e.g., a microprocessor, digital signal processor, an ASIC, an FPGA, or the like) as signals are received for analysis. Since the centralized processor may be configured to receive the signals associated with all packets transmitted within the system 100, or at least the signals transmitted between the nodes 110 and the receivers 105 of system 100 that are within range, the central processing agent 120 may also be configured to identify signals of interest via triggering. In this regard, the centralized processor may include functionality similar to the waveform detector 18.

In example embodiments where the centralized processor is a security processor, the centralized processor may be configured to receive and analyze some or all data packets communicated in the system 100 for security purposes. For example, packets may be processed for the purpose of providing advanced and adaptive security enhancements. In addition to its role as a security processor, the centralized processor may perform triggering. Upon identification of a signal of interest, the centralized processor may be configured to generate a trigger request and transmit the trigger request to appropriate receivers, possibly based on receiver information maintained in a data structure as described above. In some example embodiments, the centralized processor may be configured to perform triggering for some or all of the frequency channels associated with the system 100. Since triggering may be performed at the centralized processor, receivers 105 need not include triggering functionality and may rely on the centralized processor for triggering. In this regard, the receivers may simply receive trigger requests from the centralized processor.

In another triggering solution, which, as described above, may be combined with other triggering solutions within the system 100, an RF solution using burst transmissions of trigger requests may be implemented. In this regard, the system 100 may be configured such that communications within the system 100 are formatted in accordance with multiple wireless communication standards (e.g., IEEE 802.11 standards and ANSI 371 standards). The burst triggering requests may be orthogonal to other communications signals on the system. For example, when a receiver analyzes an 802.11 signal and identifies a signal of interest, the receiver 105 may be configured to transmit an orthogonal burst trigger request via ANSI 371.

In yet another triggering solution, data packets, such as 802.11 data packets, may be formatted as system messages to thereby enable remote RF triggering. The system messages may be transmitted on multiple frequencies. For example, a receiver 105 configured to support 802.11A/G may utilize "A" channels to communicate trigger requests, while "B" channels may be utilized for receiving and capturing the signals for storage in the signal buffer.

Figure 4A:
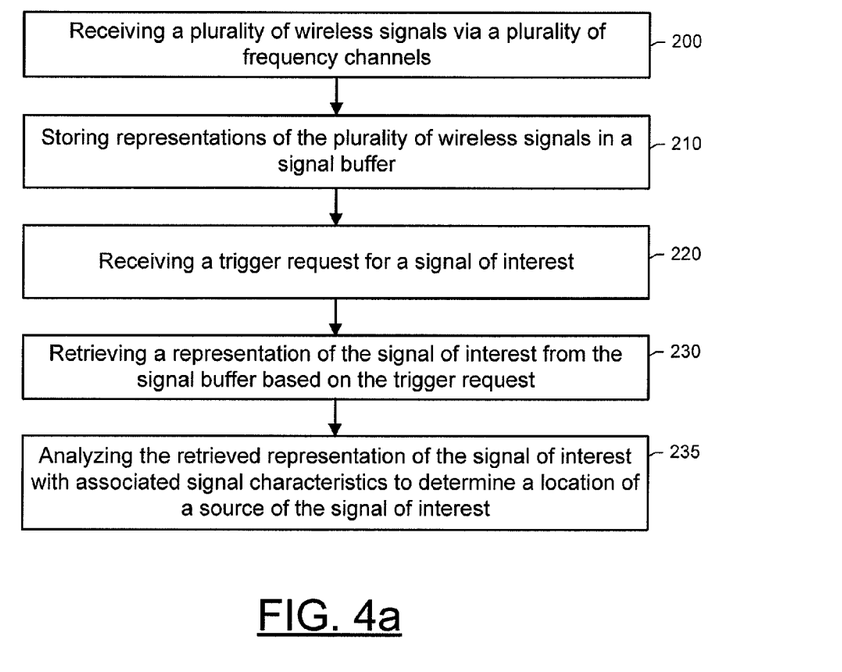
FIGS. 4a and 4b are flowcharts of methods for wireless signal storage with signal recognition detection triggering according to various example embodiments of the present invention.
Figure 4B:
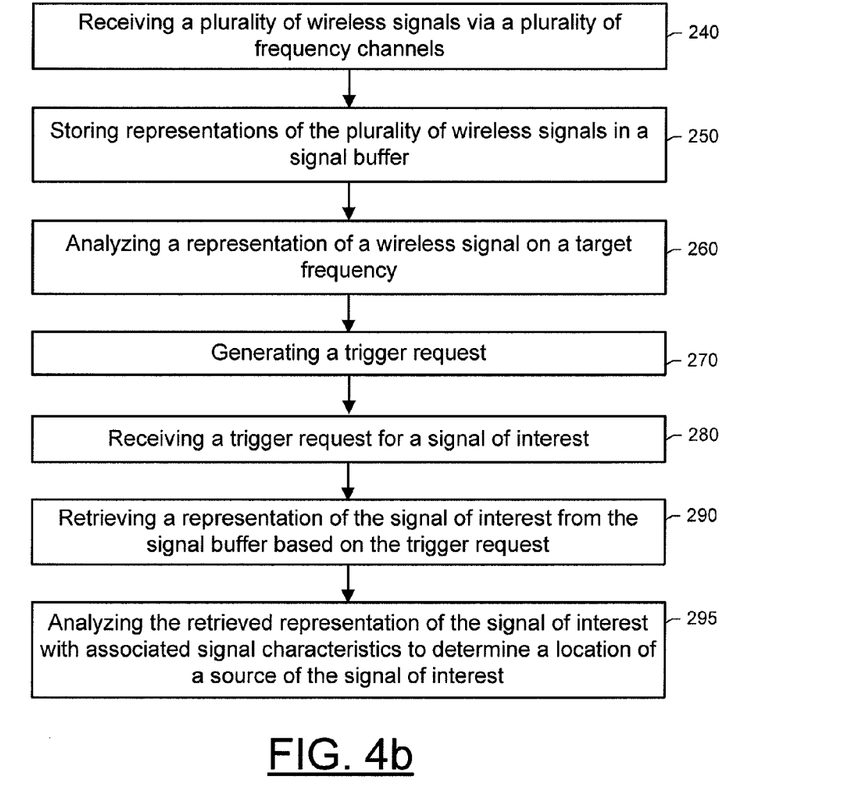

FIGS. 4a and 4b describe methods and computer program products in accordance with various example embodiments of the present invention. FIGS. 4a and 4b illustrate flowcharts of a system, method, and computer program product according to example embodiments of the invention. It will be understood that each block, step, or operation of the flowcharts, and/or combinations of blocks, steps, or operations in the flowcharts, can be implemented by various means. Means for implementing the blocks, steps, or operations of the flowcharts, combinations of the blocks, steps or operations in the flowcharts or other functionality of example embodiments of the invention described herein may include hardware, and/or a computer program products including a computer-readable storage medium having one or more computer program code instructions, program instructions, or executable computer-readable program code instructions store therein. In this regard, program code instructions may be stored on a memory device of an apparatus, such as the receiver 105 or the signal storage manager 130, and executed by a processor, such as the request processor 140. As will be appreciated, any such program code instructions may be loaded onto a computer or other programmable apparatus from a computer-readable storage medium to produce a particular machine, such that the particular machine becomes a means for implementing the functions specified in the flowcharts block(s), step(s), or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s), step(s), or operation(s). The program code instructions may be retrieved from a computer-readable storage medium and loaded into a computer, processor, or other programmable apparatus to configure the computer, processor, or other programmable apparatus to execute operational steps to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide steps for implementing the functions specified in the flowcharts' block(s), step(s), or operation(s).

Accordingly, execution of instructions associated with the blocks, steps, or operations of the flowcharts by a processor, or storage of instructions associated with the blocks, steps, or operations of the flowcharts in a computer-readable storage medium, support combinations of means for performing the specified functions and combinations of steps for performing the specified functions. It will also be understood that one or more blocks, steps, or operations of the flowcharts, and combinations of blocks, steps, or operations in the flowcharts, may be implemented by special purpose hardware-based computer systems and/or processors which perform the specified functions or steps, or combinations of special purpose hardware and program code instructions.

FIG. 4a describes a first example method for wireless signal storage with signal recognition detection triggering. The first example method may include receiving a plurality of wireless signals via a plurality of frequency channels at 200 and storing representations of the plurality of wireless signals in a signal buffer at 210. The first example method may also include, at 220, receiving a trigger request for a signal of interest. In this regard, the trigger request may have been generated based on an analysis of at least one wireless signal within the plurality of wireless signals to thereby identify the signal of interest. The first example method may further include retrieving a representation of the signal of interest from the signal buffer based on the trigger request at 230. At 235, the first example method may additionally include analyzing the retrieved representation of the signal of interest with associated signal characteristics (e.g., time of arrival, angle of arrival, amplitude, polarity, modulation, frequency, combinations thereof, or the like) to determine a location of a source of the signal of interest. According to various example embodiments, at least one of operations 200 through 235 may be performed by a processor, such as the request processor 140.

FIG. 4b describes a second example method for wireless signal storage with signal recognition detection triggering. In this regard, the second example method may include receiving a plurality of wireless signals via a plurality of frequency channels at 240 and storing representations of the plurality of wireless signals in a signal buffer at 250. According to some example embodiments, storing the representations of the plurality of wireless signals may include storing the representations of the plurality of wireless signals in association with corresponding time-of-arrival information.

In some example embodiments, the second example method may further include analyzing a representation of a wireless signal on a target frequency channel to identify the signal of interest at 260. In this regard, the target frequency channel may be one of the plurality of frequency channels. Further, in accordance with various example embodiments, the second example method may include generating the trigger request in response to identification of the signal of interest at 270.

The second example method may also include, at 280, receiving a trigger request for a signal of interest. In this regard, the trigger request may have been generated based on an analysis of at least one wireless signal within the plurality of wireless signals to thereby identify the signal of interest. In some example embodiments, receiving the trigger request may include receiving the trigger request from a central processing agent or a remote receiver. In this regard, the central processing agent or remote receiver may have performed the analysis of the at least one wireless signal within the plurality of wireless signals to thereby identify a signal of interest within the plurality of wireless signals. Additionally, or alternatively, in some example embodiments, receiving the trigger request for the signal of interest may include the signal of interest having been received on a frequency channel other than the target frequency channel for analysis. Further, alternatively or additionally, some example embodiments of the second example method may include the signal of interest being a signal for asset location based on time-of-arrival information associated with the signal of interest. In some example embodiments, receiving the trigger request may include receiving the trigger request via a broadcast transmission that is orthogonal to the signal of interest. In still other example embodiments, the second example method may additionally or alternatively include receiving the trigger request where the trigger request includes target time-of-arrival criteria for the signal of interest.

The second example method may further include retrieving a representation of the signal of interest from the signal buffer based on the trigger request at 290. At 295, the second example method may additionally include analyzing the retrieved representation of the signal of interest with associated signal characteristics to determine a location of a source of the signal of interest. According to various example embodiments, at least one of operations 240 through 295 may be performed by a processor, such as the request processor 140.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
receiving a plurality of wireless signals via a plurality of frequency channels;
storing representations of the plurality of wireless signals in a signal buffer;
receiving a trigger request for a signal of interest, the trigger request having been generated based on an analysis of at least one wireless signal within the plurality of wireless signals to thereby identify the signal of interest;
retrieving a representation of the signal of interest from the signal buffer based on the trigger request, wherein the retrieving is performed by a processor; and
analyzing the retrieved representation of the signal of interest with associated signal characteristics to determine a location of a source of the signal of interest.

2. The method of claim 1, wherein receiving the trigger request includes receiving the trigger request from a central processing agent or a remote receiver, the central processing agent or remote receiver having performed the analysis of the at least one wireless signal within the plurality of wireless signals to thereby identify a signal of interest within the plurality of wireless signals.

3. The method of claim 1 further comprising:
analyzing a representation of a wireless signal on a target frequency channel to identify the signal of interest, the target frequency channel being one of the plurality of frequency channels; and
generating the trigger request in response to identification of the signal of interest.

4. The method of claim 1 further comprising:
analyzing a representation of a wireless signal on a target frequency channel, the target frequency channel being one of the plurality of frequency channels; and
wherein receiving the trigger request includes receiving the trigger request for the signal of interest, the signal of interest having been received on a frequency channel other than the target frequency channel.

5. The method of claim 1, wherein receiving the trigger request includes receiving the trigger request for the signal of interest, the signal of interest being a signal for asset location based on time-of-arrival information associated with the signal of interest.

6. The method of claim 1, wherein receiving the trigger request includes receiving the trigger request via a broadcast transmission, the broadcast transmission being orthogonal to the signal of interest.

7. The method of claim 1, wherein storing the representations of the plurality of wireless signals includes storing the representations of the plurality of wireless signals in association with corresponding time-of-arrival information; and
wherein receiving the trigger request includes receiving the trigger request, the trigger request including target time-of-arrival criteria for the signal of interest.

8. The method of claim 1, wherein receiving the plurality of wireless signals includes receiving the plurality of wireless signals, the plurality of wireless signals including one or more of IEEE 802.11 signals, ANSI 371 signals, ISO2730 signals, Ultra-wide Band (UWB) signals, IEEE 802.15.4 signals, IEEE 802.15.4a signals, Zigbee signals, ISO 18000-7 signals, Bluetooth signals, or orthogonal frequency division multiplexed signals.

9. The method of claim 1, wherein receiving the trigger request for the signal of interest includes receiving the trigger request for the signal of interest, the signal of interest including a data pattern of an identifier of a source of the signal of interest.

10. The method of claim 1, wherein the processor is a component of an access point.

11. An apparatus comprising:
a radio frequency front end configured to receive a plurality of wireless signals via a plurality of frequency channels;
a signal buffer configured to store representations of the plurality of wireless signals; and
a processor configured to:
receive a trigger request for a signal of interest, the trigger request having been generated based on an analysis of at least one wireless signal within the plurality of wireless signals to thereby identify the signal of interest,
retrieve a representation of the signal of interest from the signal buffer based on the trigger request, and
analyze the retrieved representation of the signal of interest with associated signal characteristics to determine a location of a source of the signal of interest.

12. The apparatus of claim 11, wherein the processor configured to receive the trigger request includes being configured to receive the trigger request from a central processing agent or a remote receiver, the central processing agent or remote receiver having performed the analysis of the at least one wireless signal within the plurality of wireless signals to thereby identify a signal of interest within the plurality of wireless signals.

13. The apparatus of claim 11, wherein the processor is further configured to:
analyze a representation of a wireless signal on a target frequency channel to identify the signal of interest, the target frequency channel being one of the plurality of frequency channels; and
generate the trigger request in response to identification of the signal of interest.

14. The apparatus of claim 11, wherein the processor is further configured to analyze a representation of a wireless signal on a target frequency channel, the target frequency channel being one of the plurality of frequency channels; and
wherein the processor configured to receive the trigger request includes being configured to receive the trigger request for the signal of interest, the signal of interest having been received on a frequency channel other than the target frequency channel.

15. The apparatus of claim 11, wherein the processor configured to receive the trigger request includes being configured to receive the trigger request for the signal of interest, the signal of interest being a signal for asset location based on time-of-arrival information associated with the signal of interest.

16. The apparatus of claim 11, wherein the processor configured to receive the trigger request includes being configured to receive the trigger request via a broadcast transmission, the broadcast transmission being orthogonal to the signal of interest.

17. The apparatus of claim 11, wherein the signal buffer configured to store the representations of the plurality of wireless signals includes being configured to store the representations of the plurality of wireless signals in association with corresponding time-of-arrival information; and
wherein the processor configured to receive the trigger request includes being configured to receive the trigger request, the trigger request including target time-of-arrival criteria for the signal of interest.

18. The apparatus of claim 11, wherein the radio frequency front end configured to receive the plurality of wireless signals includes being configured to receive the plurality of wireless signals, the plurality of wireless signals including one or more of IEEE 802.11 signals, ANSI 371 signals, ISO2730 signals, Ultra-wide Band (UWB) signals, IEEE 802.15.4 signals, IEEE 802.15.4a signals, Zigbee signals, ISO 18000-7 signals, Bluetooth signals, or orthogonal frequency division multiplexed signals.

19. The apparatus of claim 11, wherein the processor configured to receive the trigger request for the signal of interest includes being configured to receive the trigger request for the signal of interest, the signal of interest including a data pattern of an identifier of a source of the signal of interest.

20. The apparatus of claim 11, wherein the apparatus comprises an access point.

21. A computer program product comprising at least one non-transitory computer-readable storage medium having executable computer-readable program code instructions stored therein, the computer-readable program code instructions configured direct an apparatus to:
store representations of a plurality of wireless signals in a signal buffer, the plurality of wireless signals having been received via a plurality of frequency channels;
retrieve a representation of a signal of interest from the signal buffer based on the trigger request, the trigger request having been generated based on an analysis of at least one wireless signal within the plurality of wireless signals to thereby identify the signal of interest; and
analyze the retrieved representation of the signal of interest with associated signal characteristics to determine a location of a source of the signal of interest.

22. The computer program product of claim 21, wherein the computer-readable program code instructions configured direct the apparatus to retrieve the representation of the signal of interest include being configured to direct the apparatus to retrieve the representation of the signal of interest based on the trigger request, the trigger request having been received from a central processing agent or a remote receiver, the central processing agent or remote receiver having performed the analysis of the at least one wireless signal within the plurality of wireless signals to thereby identify a signal of interest within the plurality of wireless signals.

23. The computer program product of claim 21, wherein the computer-readable program code instructions are further configured to direct the apparatus to:
  analyze a representation of a wireless signal on a target frequency channel to identify the signal of interest, the target frequency channel being one of the plurality of frequency channels; and
  generate the trigger request in response to identification of the signal of interest.

24. The computer program product of claim 21, wherein the computer-readable program code instructions are further configured to direct the apparatus to analyze a representation of a wireless signal on a target frequency channel, the target frequency channel being one of the plurality of frequency channels; and wherein the computer-readable program code instructions configured to retrieve the representation of the signal of interest include being configured to retrieve the representation of the signal of interest, the signal of interest having been received on a frequency channel other than the target frequency channel.

25. The computer program product of claim 21, wherein the computer-readable program code instructions configured to direct the apparatus to retrieve the representation of the signal of interest include being configured to direct the apparatus to retrieve the representation of the signal of interest, the signal of interest being a signal for asset location based on time-of-arrival information associated with the signal of interest.

26. The computer program product of claim 21, wherein the computer-readable program code instructions configured to direct the apparatus to store the representations of the plurality of wireless signals include being configured to direct the apparatus to store the representations of the plurality of wireless signals in association with corresponding time-of-arrival information; and
  wherein the computer-readable program code instructions configured to direct the apparatus to receive the trigger request include being configured to direct the apparatus to receive the trigger request, the trigger request including target time-of-arrival criteria for the signal of interest.

27. The computer program product of claim 21, wherein the computer-readable program code instructions configured to direct the apparatus to store representations of the plurality of wireless signals include being configured to direct the apparatus to store representations of the plurality of wireless signals, the plurality of wireless signals including one or more of IEEE 802.11 signals, ANSI 371 signals, ISO2730 signals, Ultra-wide Band (UWB) signals, IEEE 802.15.4 signals, IEEE 802.15.4a signals, Zigbee signals, ISO 18000-7 signals, Bluetooth signals, or orthogonal frequency division multiplexed signals.

28. The computer program product of claim 21, wherein the computer-readable program code instructions configured to direct the apparatus to receive the trigger request for the signal of interest include being configured to direct the apparatus to receive the trigger request for the signal of interest, the signal of interest including a data pattern of an identifier of a source of the signal of interest.

* * * * *